No. 746,920. PATENTED DEC. 15, 1903.
J. BURNSEN.
CONDUIT FOR HOSE, CABLES, ELECTRIC WIRES, OR THE LIKE.
APPLICATION FILED MAY 8, 1903.
NO MODEL.

WITNESSES:
Paul Hunter
C. R. Ferguson

INVENTOR
John Burnsen
BY
Munn
ATTORNEYS.

No. 746,920. Patented December 15, 1903.

UNITED STATES PATENT OFFICE.

JOHN BURNSEN, OF WEST SUPERIOR, WISCONSIN.

CONDUIT FOR HOSE, CABLES, ELECTRIC WIRES, OR THE LIKE.

SPECIFICATION forming part of Letters Patent No. 746,920, dated December 15, 1903.

Application filed May 8, 1903. Serial No. 156,172. (No model.)

*To all whom it may concern:*

Be it known that I, JOHN BURNSEN, a citizen of the United States, and a resident of West Superior, in the county of Douglas and State of Wisconsin, have invented a new and Improved Conduit for Hose, Cables, Electric Wires, or the Like, of which the following is a full, clear, and exact description.

This invention relates to improvements in conduits designed to be placed across a street below the surface thereof, so that fire-hose may be passed through it and not interfere with traffic on the street and not be subject to damage from vehicles, as sometimes happens when the hose is placed on the street surface. The conduit may also be placed on the bed of a body of water, through which electric wires or other devices may be carried across the stream or body of water.

An object of the invention is to provide in connection with such conduit a simple means for drawing hose or other devices through the conduit.

I will describe the conduit for hose, cables, electric wires, and the like embodying my invention and then point out the novel features in the appended claims.

Reference is to be had to the accompanying drawings, forming a part of this specification, in which similar characters of reference indicate corresponding parts in all the figures.

Figure 1:
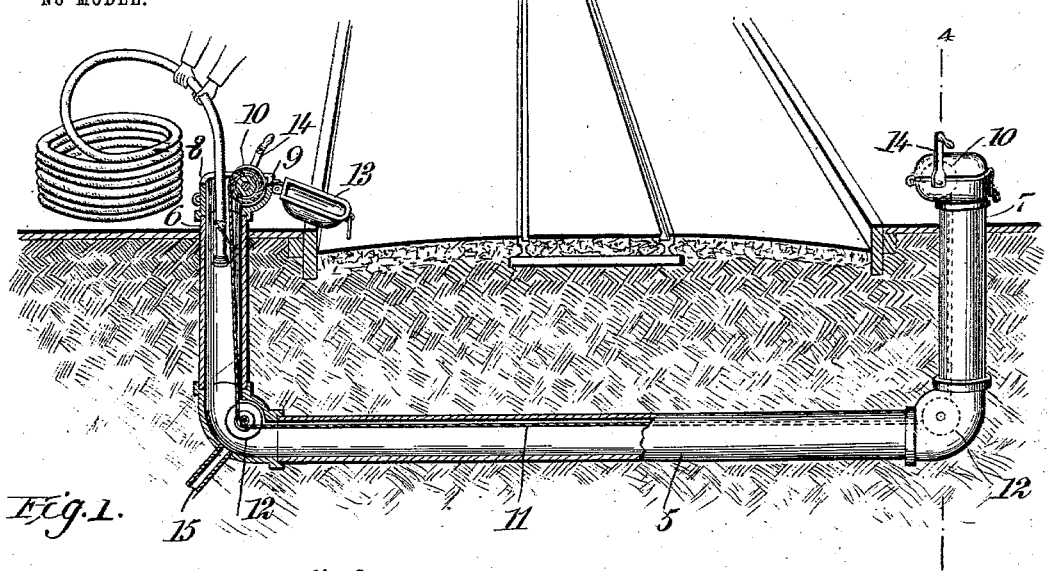
Figure 2:
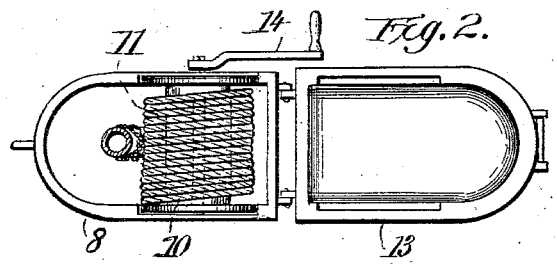
Figure 4:
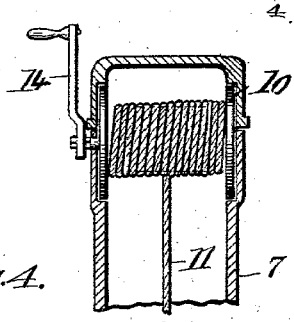
Figure 3:
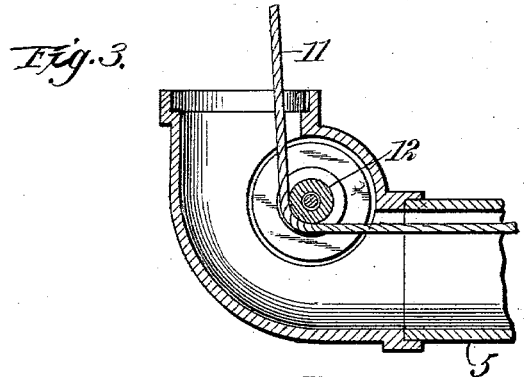
Figure 5:
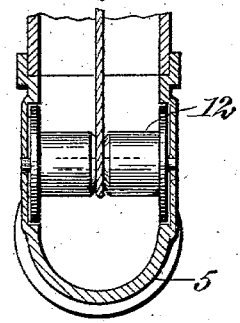

Figure 1 is an elevation, partly in section, of a conduit embodying my invention. Fig. 2 is a plan view of one of the power or winding devices employed. Fig. 3 is a sectional elevation showing one of the guide-rollers employed. Fig. 4 is a section on the line 4 4 of Fig. 1, and Fig. 5 shows a modification.

The conduit comprises a tubular or pipe section 5, designed to be placed underneath the ground surface and across a street or the like. In Fig. 1 the device is shown as crossing underneath the street, and at the ends of the horizontal portion 5 are upward extensions 6 7, which extend upward above the surface and, as here shown, through the pavement at the inner side of the curbing. On the upper end of each upward extension is a boxing 8, having an offset portion 9, in which a winding-drum 10 is placed. A cable 11 passes through the conduit from one winding-drum to the other, and at the junction of the horizontal portion 5 and the vertical portions of the conduit guide-rollers 12 are placed. These guide-rollers have annular channels which receive the cable and not only prevent its slipping laterally, but with this arrangement the cable will not project beyond the surface of the rollers and interfere with the hose or the like attached to the cable and moved through the conduit. Each boxing is provided with a swinging cover 13, which when the device is not in use may be locked down. It may be here stated that when the device is used for fire-hose the key of the lock will be in the possession of the fireman, as will also the cranks 14, removably engaging with the shafts of the drums.

At its lower portion the conduit may be provided with a drain-pipe 15, leading to a sewer or any other point of discharge.

In the operation when it is desired to carry a hose across the street its end is to be attached to the cable by means of a cord or the like, as clearly indicated in Fig. 1, and by operating the drum at the opposite side of the street it is obvious the hose will be drawn through the conduit.

In Fig. 5 I have shown the conduit as extended across a stream of water. When the conduit is thus placed, I may employ motors for operating the winding-drums. In this Fig. 5 I have indicated electric motors 16, one at each end of the conduit.

Having thus described my invention, I claim as new and desire to secure by Letters Patent—

1. A device for the purpose described, comprising a conduit or pipe having a substantially horizontal portion, and vertical portions at the ends thereof, winding-drums at the upper ends of the upwardly-extended portions and attached thereto, a cable extended through the conduit and connected with said winding devices, and guide-rollers at the lower ends of said upwardly-extended portions.

2. A device for the purpose described, comprising a conduit having a portion arranged underneath the ground surface, end portions extended upward from said first-named portion, guide-rollers at the junction of the upright portions and the first-named portion, boxings arranged on the upper and outer ends of the upright portions, the said boxings having offsets, winding-drums arranged in the offsets, a cable connecting with the drums and passing around said guide-rollers, and covers for the boxings.

3. In a device of the character described, a conduit having a portion arranged underneath the ground surface, and portions extended upward from the ends thereof, guide-rollers at the junctions of the upright portions and the first-named portion, the said guide-rollers having annular grooves, winding-drums at the upper ends of the upright portions, a cable having connection with said drums and extending into the grooves of the pulleys, boxings in which said winding-drums are arranged, swinging covers for the boxings, and a drain-pipe leading from the conduit.

In testimony whereof I have signed my name to this specification in the presence of two subscribing witnesses.

JOHN BURNSEN.

Witnesses:
J. B. FRENCH,
J. S. CRAIG.